US008672766B1

(12) United States Patent
Hancherick

(10) Patent No.: US 8,672,766 B1

(45) Date of Patent: Mar. 18, 2014

(54) ROL-LEE GAMING CABINET

(76) Inventor: Kenneth J Hancherick, Las Vegas, NV (US)

(*) Notice: Subject to any disclaimer, the term of this patent is extended or adjusted under 35 U.S.C. 154(b) by 1046 days.

(21) Appl. No.: 12/287,391

(22) Filed: Oct. 10, 2008

Related U.S. Application Data

(60) Provisional application No. 61/024,017, filed on Jan. 28, 2008.

(51) Int. Cl.
*A63F 9/24* (2006.01)
*A63F 13/00* (2006.01)

(52) U.S. Cl.
USPC .................................. 463/46; 463/20; 463/47

(58) Field of Classification Search
USPC .................................. 463/46
See application file for complete search history.

(56) References Cited

U.S. PATENT DOCUMENTS

| | | | | |
|---|---|---|---|---|
| 4,440,457 | A * | 4/1984 | Fogelman et al. | 463/46 |
| 5,720,662 | A * | 2/1998 | Holmes et al. | 463/20 |
| 6,135,884 | A * | 10/2000 | Hedrick et al. | 463/20 |
| 6,164,645 | A * | 12/2000 | Weiss | 273/138.2 |
| 6,186,894 | B1 * | 2/2001 | Mayeroff | 463/20 |
| 6,224,483 | B1 * | 5/2001 | Mayeroff | 463/20 |
| 6,231,442 | B1 * | 5/2001 | Mayeroff | 463/20 |
| 6,368,216 | B1 * | 4/2002 | Hedrick et al. | 463/20 |
| 6,475,087 | B1 * | 11/2002 | Cole | 463/20 |
| 6,644,663 | B2 * | 11/2003 | Seelig et al. | 273/143 R |
| 6,715,756 | B2 * | 4/2004 | Inoue | 273/143 R |
| 6,786,818 | B1 * | 9/2004 | Rothschild et al. | 463/20 |
| 6,860,814 | B2 * | 3/2005 | Cole | 463/46 |
| 7,040,620 | B2 * | 5/2006 | Seelig et al. | 273/143 R |
| 7,086,944 | B2 * | 8/2006 | Colton | 463/20 |
| 7,513,830 | B2 * | 4/2009 | Hajder et al. | 463/46 |
| 7,540,806 | B2 * | 6/2009 | Tastad | 463/46 |
| 7,594,852 | B2 * | 9/2009 | Rasmussen | 463/20 |
| 7,641,556 | B2 * | 1/2010 | Tedsen et al. | 463/46 |
| 7,806,770 | B2 * | 10/2010 | Taxon | 463/46 |
| 7,846,026 | B2 * | 12/2010 | Stephenson et al. | 463/46 |
| 7,862,436 | B2 * | 1/2011 | Cole | 463/47 |
| 7,905,783 | B2 * | 3/2011 | Cole | 463/46 |
| 2003/0027627 | A1 * | 2/2003 | Cole | 463/20 |
| 2004/0018870 | A1 * | 1/2004 | Cole | 463/20 |
| 2004/0053699 | A1 * | 3/2004 | Rasmussen et al. | 463/46 |
| 2005/0143176 | A1 * | 6/2005 | Cole | 463/46 |
| 2005/0255924 | A1 * | 11/2005 | Cole | 463/46 |
| 2007/0265099 | A1 * | 11/2007 | Cole | 463/46 |
| 2010/0113146 | A1 * | 5/2010 | Hedrick et al. | 463/30 |
| 2010/0173704 | A1 * | 7/2010 | Cole | 463/30 |
| 2011/0151958 | A1 * | 6/2011 | Cole | 463/20 |
| 2011/0177865 | A1 * | 7/2011 | Cole | 463/31 |

* cited by examiner

*Primary Examiner* — Steven J Hylinski

(74) *Attorney, Agent, or Firm* — Howard & Howard Attorneys PLLC

(57) ABSTRACT

A compact gaming cabinet that efficiently allows both mechanical reels and LCD flat screen video to operate in tight areas with a unique, high security door design which offers additional protection against tampering while maintaining easy internal cabinet access for improved maintenance and serviceability. Additionally, extra "creature" conveniences are integrated into the cabinet to enhance player comfort.

7 Claims, 6 Drawing Sheets

FIG #1
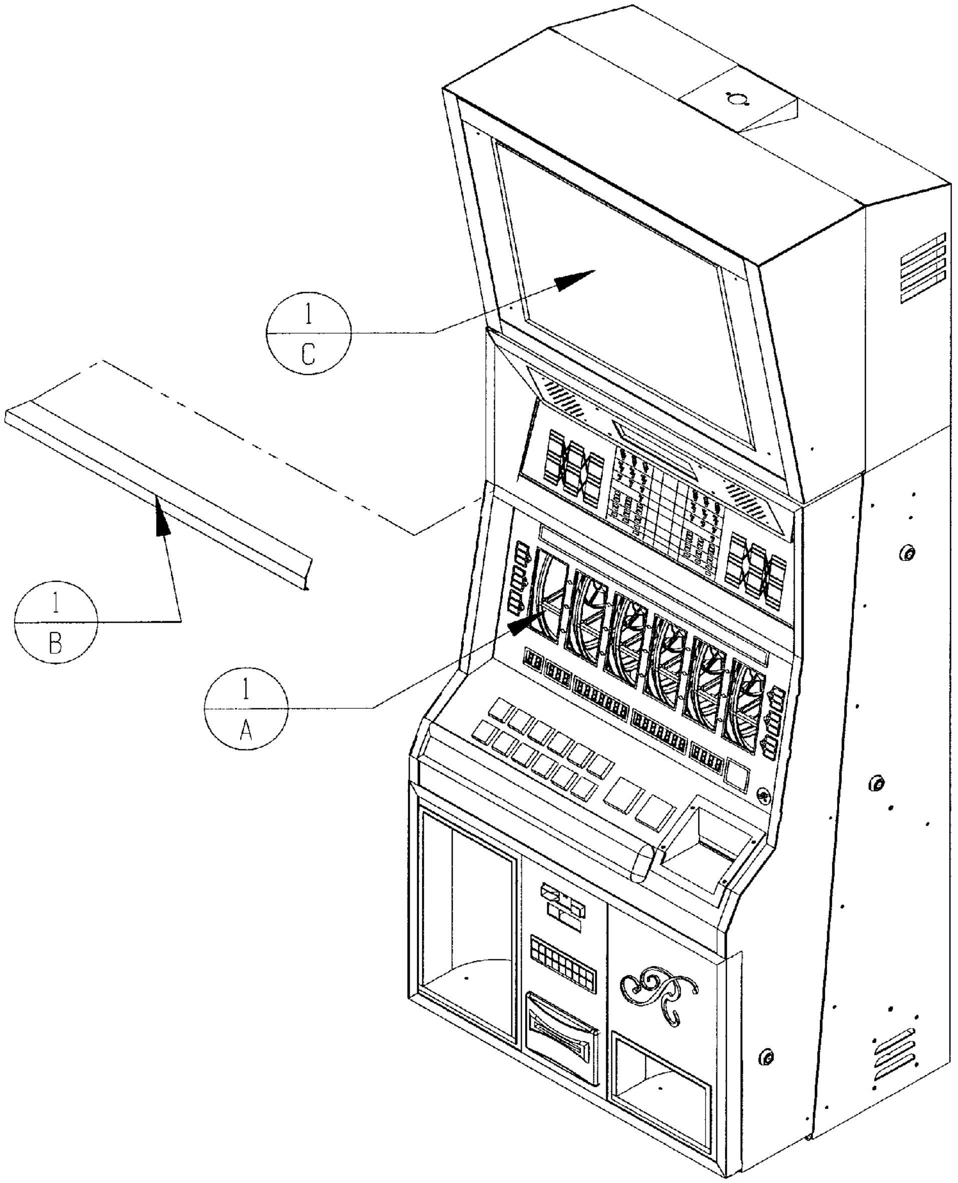

FIG # 2
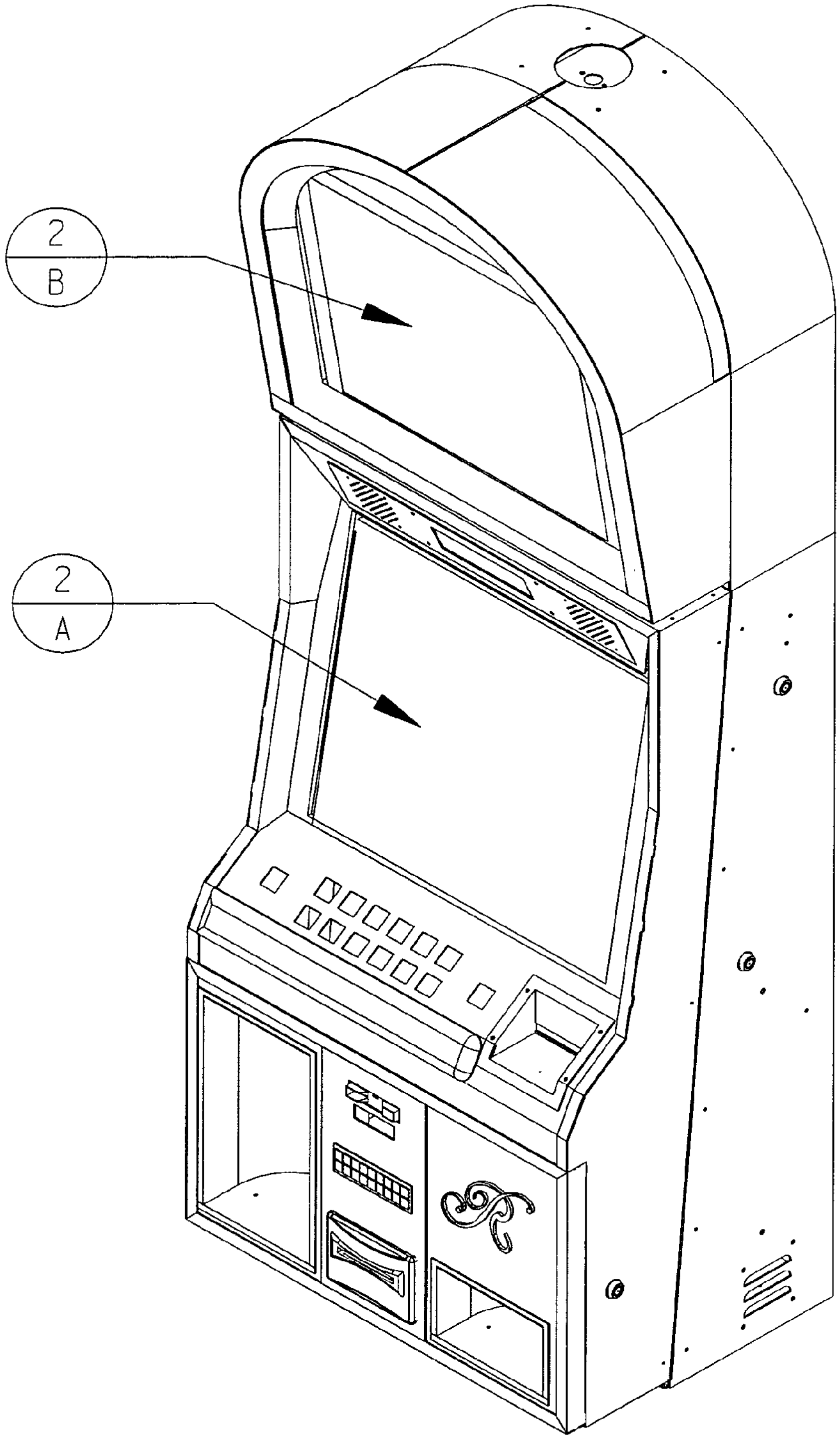

FIG # 3
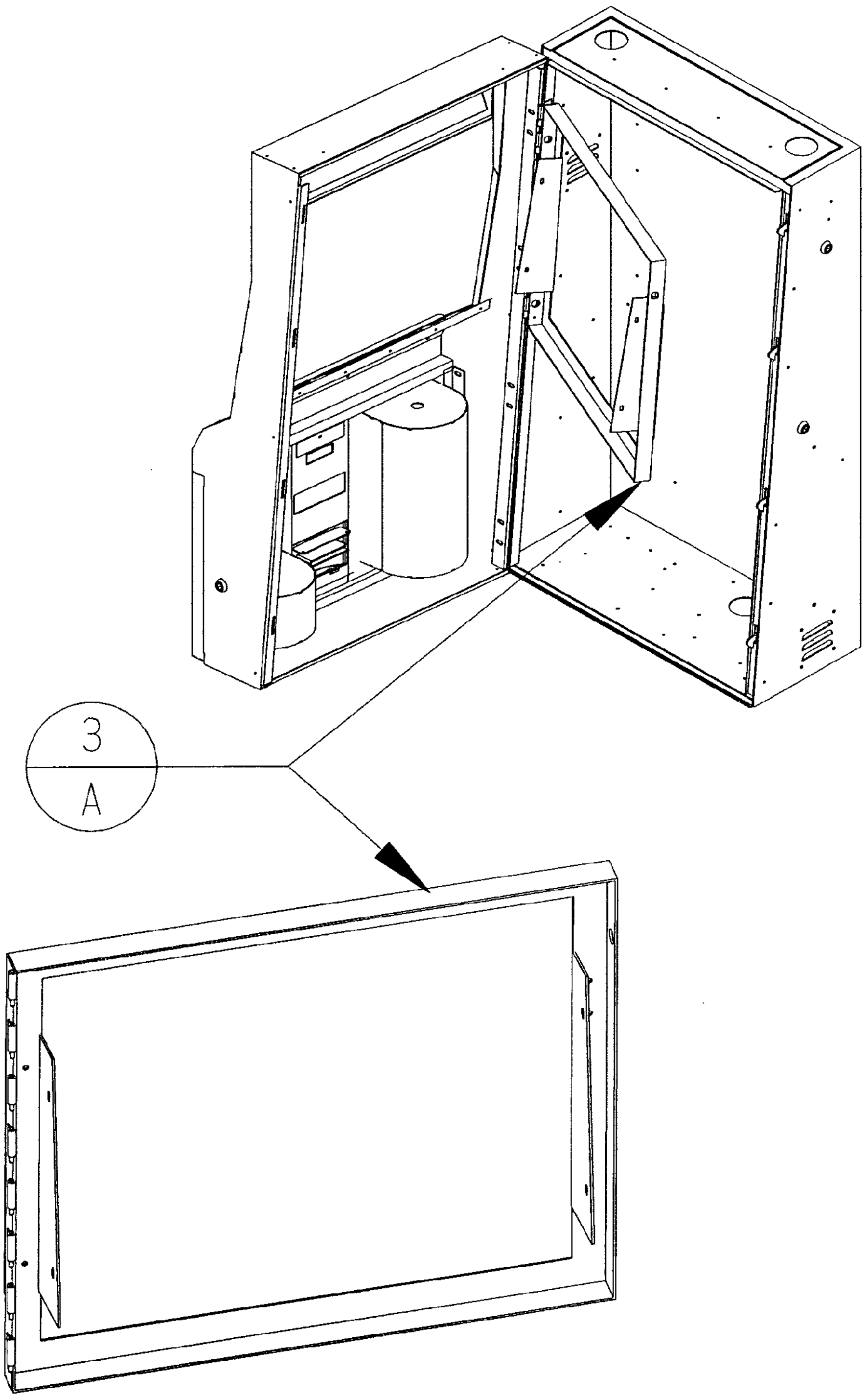

FIG # 4
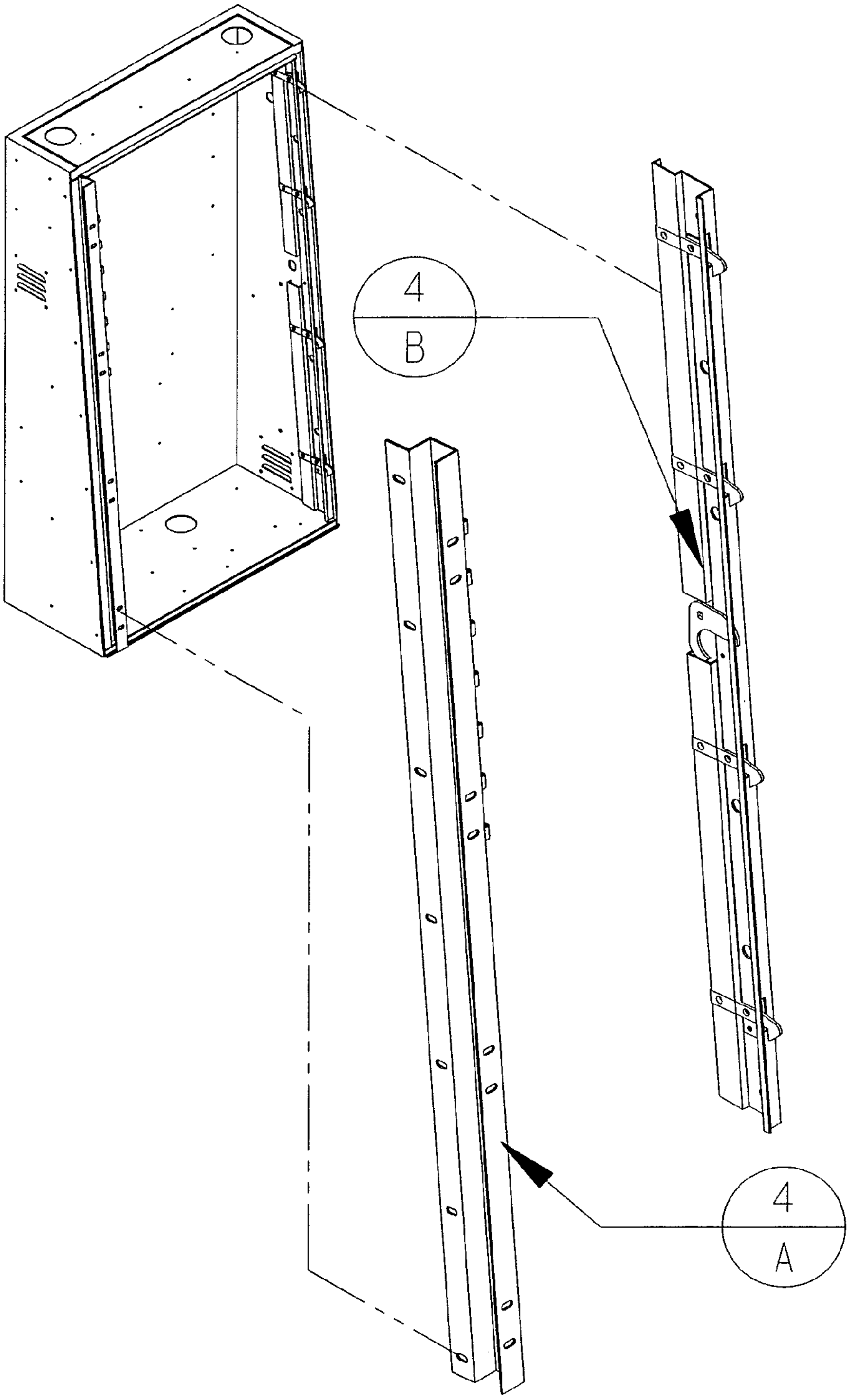

FIG #5
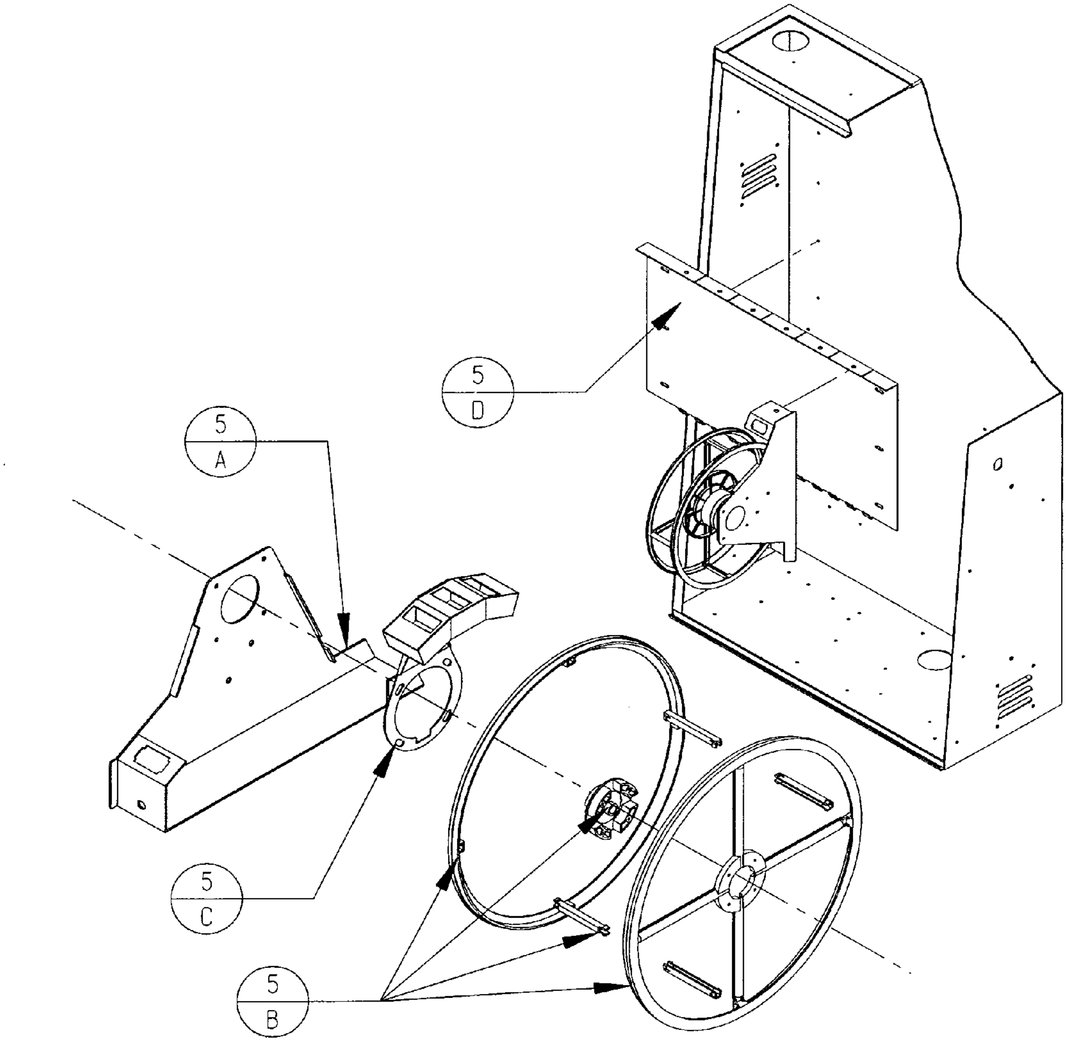

FIG # 6
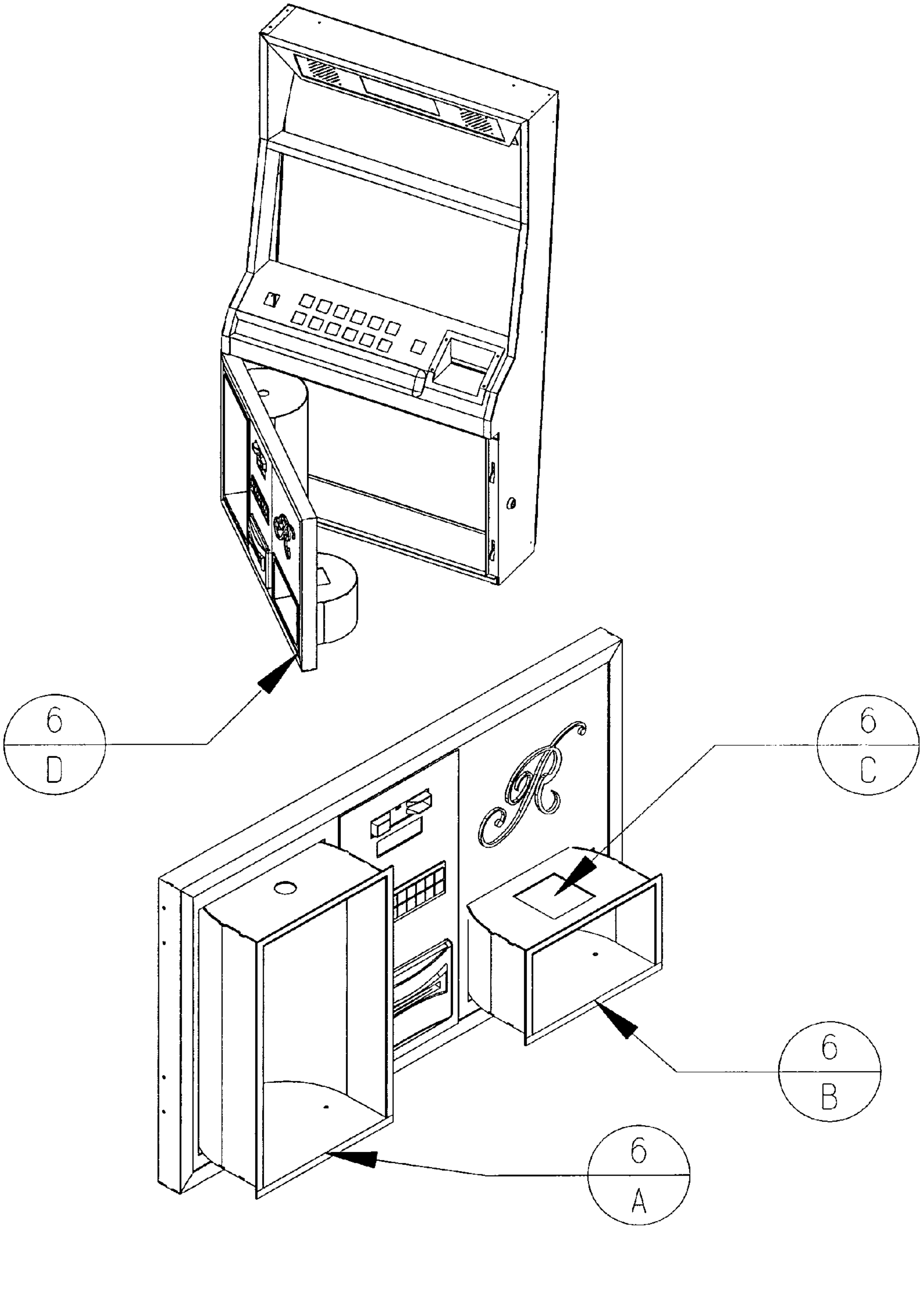

ROL-LEE GAMING CABINET

This non-provisional application claims priority to provisional patent No. 61/024,017 filed on; Jan. 28, 2008

BACKGROUND OF THE INVENTION

In the early days of amusement and gaming devices, cabinet design focused primarily on esthetic appeal. Coin operated devices looked visually stunning but offered little in the way of security. Even the basic functions of a game were intended to be impressive, such as exposed coin escalators that rotated the coins into the machine as the players inserted them. Today, the quality and workmanship of the earliest slot machines from the 1930's, such as the Mills' Hi Top and Jennings Tic-Tac-Toe are well known, and often imitated by antique replicas. The problem was, these early games had simple cam locks that could be pried open relatively easily with a screwdriver.

The modern coin operated era began with the advent of reel stepper motors, video monitors and bill validators. However, this presented a new set of problems for manufacturers. In the early days, a simple coin was the vehicle that activated play. Today, a casino game has literally become a bank vault. Modern games accept currency of every denomination and in large quantities. This means, at any given time, a single casino game may contain thousands of dollars.

Originally, modern mechanical slot machines almost always had three rotating reels. Recently however, slot machines, both mechanical and video, have begun to commonly contain five or more reels. This trend is likely to increase with slot machines having greater and greater numbers of reels. But while the number of reels is increasing, gaming cabinets are shrinking in size to maximize casino floor space. The solution is a slim and compact cabinet that efficiently allows both mechanical and video gaming machines to be operated in tight quarters.

The issue for manufacturers today is; how to design a game that looks appealing while still maintaining the high security needed to prevent tampering. Steel became the answer. Modern gaming machines are either built entirely out of steel or built out of wood and completely lined with steel. This makes a modern machine quite heavy and at times, difficult to work on. Access doors on gaming cabinets are bulky and sometimes difficult to open or close and lock.

Another issue in a modern casino is drink spillage. Most casinos today allow players to drink while they play. Unfortunately, the players are forced to place their drinks on top of the machine, on the control panel or some other inconvenient location. This can be devastating for an electronic gaming device because a spilled drink can totally destroy the computer circuitry. The solution is to integrate the drink compartment into the door in an easily accessible location that is below the critical circuitry so that if a spill does occur, nothing important is damaged.

Most modern casinos allow smoking. States such as Nevada have passed a "clean indoor air act", meaning that all smoking players must now go to casinos if they wish to smoke and gamble. This increases patronage of smokers in the casinos but presents an increased problem for non-smoking players. The solution is an integrated ashtray compartment with the ability to actively draw smoke away from the player.

The modern gaming industry has become complex. The games are sophisticated. The cabinets are intricate with many small, interlocking moving parts. But one thing that is sure never to go out of style, manufacturers will continue to search for ways to impress the players while not making themselves vulnerable to the temptation of theft.

| RELEVANT PATENTS: | | |
|---|---|---|
| 4,440,457 | Apr. 3, 1984 | Fogelman, Ambrose |
| 5,351,176 | Dec. 31, 1992 | Smith, Oliver |
| 5,813,914 | Mar. 25, 1997 | McKay, Dickenson |
| 6,290,229 | Dec. 20, 1999 | Perez |
| 6,958,015 | Aug. 25, 2004 | Luciano, Anderson |
| 7,267,613 | Sep. 12, 2003 | Cole |

SUMMARY OF THE INVENTION

The present invention pertains to a new gaming cabinet enclosure, consisting of several new features designed to enhance security, maintenance and player convenience.

In one preferred embodiment, the cabinet may house a plurality of rotating mechanical stepper reels and may also include a video monitor for additional play features.

In one preferred embodiment, the cabinet may house a single or plurality of video monitors which will typically be of the LCD (liquid crystal display) type but may also be of the CRT (cathode ray tube) type.

BRIEF DESCRIPTION OF THE DRAWINGS

FIG. 1:

Represents one embodiment of the invention, housing up to seven mechanical, rotating reels (see item 1A) with removable divider bar (see item 1B) to allow for installation of an LCD monitor instead of mechanical reels. This iteration of the invention may also include the capability for a secondary, upper LCD type monitor (see item 1C), mounted above the mechanical reels.

FIG. 2:

Represents a second embodiment of the invention, housing a lower LCD type monitor (see item 2A) as well as allowing for an optional, secondary upper LCD type monitor (see item 2B).

FIG. 3:

Shows an interior cabinet view with the monitor swing gate (see item 3A).

FIG. 4:

Shows the security channel (see item 4A) and the four-point door security locking mechanism (see item 4B).

FIG. 5:

Shows how the low-profile reel bracket assembly (see item 5A), the four-piece basket assembly (see item 5B) and the line indicator bracket assembly (see item 5C) attach to the rear, multi-reel mounting plate (see item 5D) which allows as many as seven reels.

FIG. 6:

Shows the flush-mounted and removable drink compartment (see item 6A) and ashtray compartment (see item 6B) with overhead smoke ventilation system (see item 6C) which are both installed on the lower, cabinet belly door (see item 6D).

DESCRIPTION OF THE PREFERRED EMBODIMENTS

FIGS. 1 and 2 are top assemblies and illustrate both the mechanical and video representations of the cabinet. It is also possible to create a "hybrid" cabinet where a combination of mechanical and LCD video can be used simultaneously. These two embodiments can be easily interchanged to allow the cabinet to be readily reconfigured for different games.

FIG. 3 shows the "monitor gate" on which the lower monitor is mounted, when a lower LCD monitor is installed in the cabinet. The LCD monitor gate can be opened or removed to easily gain access to the monitor or cabinet interior for maintenance and repair. The average gaming cabinet requires the complete removal of a monitor to allow for repair. This is both time consuming and risks damage to a very expensive device. The swinging monitor access gate prevents this problem and makes the game more easily serviceable.

FIG. 4 shows how the security locking mechanism is installed within the cabinet and how it is assembled. This is a key assembly which prevents the main cabinet door from begin forced open. Because the hinge assembly is embedded inside the security channel, the hinge is not exposed on the outside of the cabinet which improves the overall cabinet appearance and prevents the hinge from being tampered with. In spite of this heightened security, the locking mechanism can be easily opened due to the uniqueness of the design.

FIG. 5 shows the mechanical reel assembly which is specially designed to mount against the back wall of the cabinet. This allows the cabinet to be shallow without sacrificing the ability to house mechanical reels which typically have a greater space requirement. Additionally, the reels are designed to be compact so they can be mounted closely together to maximize the number of reels the cabinet can accommodate. Because the reel drum width is easily adjustable, the total number of reels can be changed quickly.

FIG. 6 shows the removable ashtray and drink compartment which are integrated directly into the front of the cabinet. A ducted fan option is available for the ashtray which can be used to vent smoke out the back of the machine and away from players. The drink compartment is positioned for player convenience and to prevent any drink spillage from damaging any sensitive electronics because it is mounted at the bottom of the cabinet and away from any sensitive internal electronic components.

I claim as my invention, the following:

1. A gaming machine cabinet assembly, comprising;

a housing including a first side wall, an opposing second side wall, a top wall, a bottom wall and a rear wall defining an interior cabinet space;

an access door hingedly mounted on the first side wall for rotational motion about the first side wall to a closed position, wherein the access door contacts the opposing second side wall and an open position permitting access to the interior cabinet space, the access door including an opening for viewing the interior space;

a monitor support bracket including a rectangular frame configured for engaging a rectangular monitor therein, wherein the monitor support bracket is removably hingedly mounted on the first side wall for rotational motion about the first side wall, wherein the bracket is mounted between the access door and positioned along the first side wall such that the frame remains in the interior cabinet space responsive to the access door being in the closed position and surrounds the opening in the door;

a reel supporting device including a reel mounted for rotational motion on a central axial member, the central axial member being supported at opposing ends by radial arms connected to a radial base positioned adjacent to the periphery of the reel; and a support plate for supporting one or more reel supporting devices thereon, wherein the support plate includes a first side for connecting with the radial base of on one or more reel supporting devices and a second opposing side for being mounted on the rear wall within the interior cabinet space so that the radial arms extend towards the opening, wherein the rear wall includes a receiving engagement for engaging the support plate.

2. A gaming machine cabinet assembly as recited in claim 1, further comprising a security hinge channel mounted on the first side wall for covering the hinged connections with the access door.

3. A gaming machine cabinet assembly as recited in claim 1, wherein the side walls are each twelve and one half inches wide and the rear wall is twenty one inches wide.

4. A gaming machine cabinet assembly as recited in claim 1, further comprising a lower access door hingedly mounted on the first side wall adjacent to the access door.

5. A gaming machine cabinet assembly as recited in claim 4, wherein the lower access door includes a recessed ashtray defined therein.

6. A gaming machine cabinet assembly as recited in claim 4, wherein the lower access door includes a recessed beverage receiving holder.

7. A gaming machine cabinet assembly as recited in claim 4, further comprising an upper cabinet connected to the top wall.

* * * * *